US006963373B2

United States Patent
Imaizumi

(10) Patent No.: US 6,963,373 B2
(45) Date of Patent: Nov. 8, 2005

(54) IMAGE PROCESSING APPARATUS WHICH REDUCES NOISE BY ADJUSTING THE TRANSITION TIMING

(75) Inventor: Kazuhiro Imaizumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 09/885,734

(22) Filed: Jun. 20, 2001

(65) Prior Publication Data

US 2003/0206237 A1 Nov. 6, 2003

(30) Foreign Application Priority Data

Jun. 20, 2000 (JP) .......................................... 2000-184834

(51) Int. Cl.[7] .......................... H04N 3/14; H04N 5/217; H04N 1/38; G06F 1/08
(52) U.S. Cl. ....................... 348/312; 348/241; 348/615; 358/463; 713/501
(58) Field of Search ................................ 348/241, 311, 348/242, 607, 612, 615, 624, 312; 358/463; 250/208.1; 713/501

(56) References Cited

U.S. PATENT DOCUMENTS

| | | | | |
|---|---|---|---|---|
| 5,216,509 A | * | 6/1993 | Hirasawa | 348/241 |
| 5,398,060 A | * | 3/1995 | Leacock et al. | 348/241 |
| 5,912,703 A | * | 6/1999 | Tamayama | 348/241 |
| 6,157,229 A | * | 12/2000 | Yoshikawa | 327/149 |
| 6,211,914 B1 | * | 4/2001 | Kubo | 348/241 |
| 6,493,830 B2 | * | 12/2002 | Kamei | 713/501 |
| 6,499,663 B1 | * | 12/2002 | Yahagi et al. | 348/241 |
| 6,541,751 B1 | * | 4/2003 | Bidermann | 348/241 |
| 6,691,214 B1 | * | 2/2004 | Li et al. | 713/600 |
| 6,783,073 B2 | * | 8/2004 | Yahagi et al. | 348/241 |

FOREIGN PATENT DOCUMENTS

JP         08223006 A   *   8/1996   .......... H03K/5/135

* cited by examiner

*Primary Examiner*—Aung Moe
*Assistant Examiner*—John M. Villecco
(74) *Attorney, Agent, or Firm*—Morgan & Finnegan, LLP

(57) ABSTRACT

An image processing apparatus which eliminates noise which occurs due to the influence of output from a parallel bus drive circuit added to an output final stage circuit of signal processor or the like. A delay circuit 110 which delays a video signal is inserted into a VTR signal processor such that a data transition point of particular bit in a bit array indicating horizontal-directional start and end positions of video signal data, added during a horizontal retrace period of a digital recording format video signal, does not overlap with a period for sampling a feedthrough period and a photoelectric conversion signal period in a correlated double sampling circuit.

13 Claims, 9 Drawing Sheets

BLOCK DIAGRAM SHOWING CONSTRUCTION OF FIRST EMBODIMENT

BLOCK DIAGRAM SHOWING CONSTRUCTION OF FIRST EMBODIMENT

TIMING CHART SHOWING OPERATION OF FIRST EMBODIMENT

DIAGRAM SHOWING DELAY CIRCUIT IN SECOND EMBODIMENT

EXPLANATORY VIEW OF RECORDING FORMAT CCIR Rec 601

PRIOR ART

FIG. 5

EXPLANATORY VIEW OF RECORDING FORMAT CCIR Rec 601

CONTENTS OF EAV, SAV

|             | MSB | 6 | 5 | 4 | 3  | 2  | 1  | LSB |
|-------------|-----|---|---|---|----|----|----|-----|
| FIRST WORD  | 1   | 1 | 1 | 1 | 1  | 1  | 1  | 1   |
| SECOND WORD | 0   | 0 | 0 | 0 | 0  | 0  | 0  | 0   |
| THIRD WORD  | 0   | 0 | 0 | 0 | 0  | 0  | 0  | 0   |
| FOURTH WORD | 1   | F | V | H | P3 | P2 | P1 | P0  |

| F | V | H | P3 | P2 | P1 | P0 |
|---|---|---|----|----|----|----|
| 0 | 0 | 0 | 0  | 0  | 0  | 0  |
| 0 | 0 | 1 | 1  | 1  | 0  | 1  |
| 0 | 1 | 0 | 1  | 0  | 1  | 1  |
| 0 | 1 | 1 | 0  | 1  | 1  | 0  |
| 1 | 0 | 0 | 0  | 1  | 1  | 1  |
| 1 | 0 | 1 | 1  | 0  | 1  | 0  |
| 1 | 1 | 0 | 1  | 1  | 0  | 0  |
| 1 | 1 | 1 | 0  | 0  | 0  | 1  |

00h AND ffh ARE NOT USED IN VIDEO DATA
10h (PEDESTAL LEVEL) IS USED IN OTHER POSITIONS THAN SAV AND EAV (BLANKING)
80h IS USED IN POSITIONS OF Cb AND Cr
SAV AND EAV EXIST IN ALL LINES (ALSO IN V BLANKING)
PARITY IS ALWAYS ADDED ON TRANSMITTING SIDE, AND USED ARBITRARILY ON RECEIVING SIDE

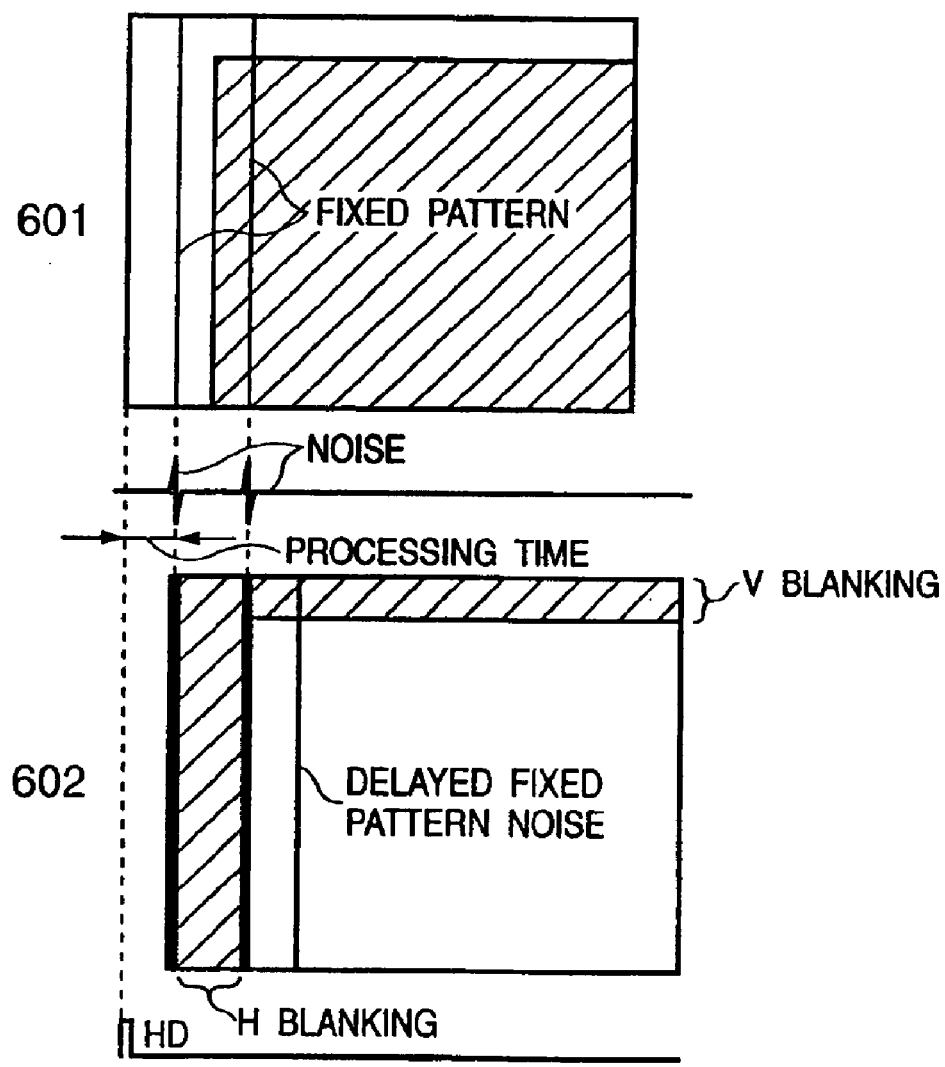

BLOCK DIAGRAM SHOWING ARRANGEMENT OF PROCESSING FINAL STAGE AND PARALLEL BUS DRIVE CIRCUIT IN VTR SIGNAL PROCESSOR

IMAGE PROCESSING APPARATUS WHICH REDUCES NOISE BY ADJUSTING THE TRANSITION TIMING

FIELD OF THE INVENTION

The present invention relates to elimination of vertical-stripe fixed pattern noise mixed into a video signal.

BACKGROUND OF THE INVENTION

As apparatuses to record a video signal on a recording medium as a digital signal, a so-called digital still camera which records a video image of object as a still picture on a memory device or disk, a combination camera and digital video tape recorder as a video tape recorder which digital-records a video image of object as a moving picture by using a magnetic tape, and the like, are practically used.

For example, the conventional combination camera and digital video tape recorder comprises an image sensing unit having a lens system which forms an image from incident light passed through a lens and a solid image sensing device such as a CCD which photoelectric-converts the incident light from the lens system into an electric signal, a camera signal processor which inputs an output signal from the image sensing device and performs signal processing in the camera, a VTR signal processor which inputs a digital video signal from the camera signal processor and performs VTR signal processing on the signal, a recording and reproduction system which records an output digital signal from the VTR signal processor on a magnetic tape upon recording and reproduces information recorded on the magnetic tape upon reproduction, and a control system which controls the lens system, the solid image sensing device, the camera signal processor, the VTR signal processor and the recording and reproduction system.

In a case where the solid image sensing device is a generally-used chrominance line-sequential complementary-color interline type CCD, the camera signal processor inputs a video signal outputted form the image sensing device into a correlated double sampling (CDS) circuit. The video signal outputted from the CDS circuit is inputted into an automatic gain control (AGC) circuit then A/D converted by an A/D converter into a digital signal, and inputted into a digital signal processing (DSP) circuit. The DSP circuit performs predetermined digital signal processing on the signal, and obtains a luminance signal component Y. Further, after synchronization of the color signals, the DSP obtains chrominance signals Cr(=R-Y) and Cb (=B-Y) and outputs the signals. Further, white balance control and AGC control to gain-control the signal level of the video signal are performed in accordance with control signals from the control system.

The VTR signal processor outputs a video signal, from the digital video signal from the camera signal processor, via an output terminal. The VTR signal processor is supplied with a control signal to generate a digital VTR signal corresponding to the digital recording format of the VTR from the control system. The digital recording format will be described later.

Upon recording, the recording and reproduction system records the video signal supplied from the VTR signal processor, as a moving picture or still picture, in a digital signal format, on a recording track of magnetic tape, via a rotary magnetic head provided in a rotary head drum. Further, upon reproduction, the recording and reproduction system reproduces the digital video signal recorded on the recording track of the magnetic tape, as a moving picture or still picture, via the rotary head drum.

FIG. 8 shows an example of circuit to generate pulses of synchronizing signals and control signal pulses outputted from the control system for adjusting operation timing of the entire apparatus. In FIG. 8, a clock generated by a reference clock generator 801 is inputted into a horizontal pulse counter 802 and a horizontal latch circuit 803. When the clock is inputted into the horizontal pulse counter 802, the counter output changes in correspondence with the number of clocks, and address data of horizontal pulse ROM 804 changes. The horizontal pulse ROM 804 holds data on control pulses necessary to control the lens system, the solid image sensing device, the camera signal processor, the VTR signal processor and the recording and reproduction system. The data outputted from the horizontal pulse ROM 804 also changes in accordance with the change of address, then the data is latched by the latch circuit 803, and pulses in a horizontal direction, i.e., a horizontal synchronizing signal such as HD, an image-sensing device horizontal drive control pulse, a horizontal control pulse and the like, are outputted. Similarly, regarding a vertical direction, the horizontal synchronizing signal such as HD from the horizontal latch circuit 803 is counted, and pulses in the vertical direction, i.e., a vertical synchronizing signal such as VD, an image-sensing device vertical drive control pulse, a vertical control pulse and the like, are outputted.

The digital video signal processing circuit (DSP) in the camera signal processor and the VTR signal processor is also supplied with the reference clock. In accordance with the synchronizing signals HD, VD and the control signal pulse outputted from the control system in synchronization with the reference clock, calculation processing is performed on a digital video signal, and the digital video signal data is latched and transmitted in synchronization with the reference clock. In this arrangement, the respective circuit systems start operations and perform processing.

As the digital recording format video signal outputted from the above-described VTR signal processor is a formatted parallel bus signal, it can be outputted via an external terminal and subjected to computer image processing in addition to the case where the signal is outputted to the recording and reproduction system incorporated in the apparatus.

Generally the VTR signal processor is an IC made by a system LSI manufacturing method as a combination of cell libraries having macrocells with various circuit functions made by a gate array process. Upon formation of the IC VTR signal processor to satisfy the above specification and to accurately transmit a digital signal to the incorporated recording and reproduction system, generally a drive cell having a higher current drive performance in comparison with other circuits is used as a parallel bus drive circuit which is further added to an output final stage of the VTR signal processor.

FIG. 9 shows an example of arrangement of the processing final stage and the parallel bus drive circuit in the conventional VTR signal processor.

A digital recording format video signal outputted from a VTR signal processor 104 is converted based on e.g. a format as shown in FIG. 4. FIG. 4 shows the outline of 8-bit parallel signal in CCIR Rec 601(consumer digital camcoder digital signal format) which is a typical digital recording format. In the digital signal format, 4-word data is added to start point and end point of H blanking period. FIG. 5 shows the contents of the additional data (EAV and SAV).

As shown in FIG. 5, bits from 1 to 0 exist in the additional data, and as all the bit change in the same phase, the transition potential becomes maximum.

However, as the data arrangement of H blanking and image data portion other than the additional data is point-sequential Cb, Y1, Cr, Y2, respective bits change differently. Accordingly, changes in the same and reverse phases and unchange are integrated to always a small amount, and as a result, the transition potential of the image data portion is small.

Accordingly, as the parallel bus drive circuit added to the output final stage of the VTR signal processor uses a drive cell having a current drive performance higher than other circuits, a high shot circuit current flows through the power supply and the ground of the parallel bus drive circuit only in a transition point of the change bit, which cannot avoid occurrence of noise which appears as a voltage variation due to common impedance component to the other circuits. In a case where the noise component is mixed into the CDS circuit when the AGC gain is high, the change may cause vertical-stripe fixed pattern noise.

FIG. 7 is a timing chart showing timings of the parallel bus drive circuit output and CDS circuit operation in the case where fixed pattern noise occurs. In FIG. 7, reference numeral 701 denotes a reference clock. Numeral 702 denotes an example of point-sequential data arrangement on parallel bus, i.e., time array of one of 8-bit parallel bus signals. Numeral 703 denotes an EAV portion of data arrangement in the H blanking portion of the data arrangement 702. A 4-bit part indicated with an arrow is the EAV constructing 4 words with other 7 bus signals (not shown). Similarly, numeral 704 denotes an SAV portion of data arrangement in the H blanking portion of the arrangement 702. A 4-bit part indicated with an arrow is SAV constructing 4 words with the other 7 bus signals (not shown). Numeral 705 denotes an example of noise component occurred in each bit transition point in the data array 704. The noise occurred at the rising edge and that falling edge of the first word of SAV are larger than those in other bits. Numeral 706 denotes a waveform schematically showing an image sensing video signal outputted from the solid image sensing device, where alphabet A represents a reset period, B, a feed through period at a reference level, and C, a photoelectric-conversion signal output period. The image sensing video signal is outputted in repetition of periods A, B and C as one cycle. Note that in FIG. 7, the drive cycle of the solid image sensing device is double of the cycle of the reference clock 701.

Further, in FIG. 7, numeral 707 denotes a phase pulse for sampling the feedthrough period B when the image sensing video signal 706 outputted from the solid image-sensing device is inputted into the CDS circuit and processed there, and 708, a phase pulse for sampling the photoelectric-conversion signal in the period C. The phases and opening lengths of these sampling pulses are set in most appropriate positions to obtain effect of the CDS circuit (generally noise suppression effect to 4 to 5 dB reset noise and output amplifier noise) and uniquely determined. In the waveform 706, the noise component 705 is mixed with the image sensing video signal at timing D.

FIG. 6 schematically shows the video signal output where the noise is mixed. In FIG. 6, numeral 601 denotes an image signal position upon image-sensing device signal output, where a hatched portion represents an effective video signal region including optical block bit array provided on an image sensing device photoelectric conversion region.

Numeral 602 denotes an image signal position upon parallel bus drive circuit output, where a hatched portion represents H blanking and V blanking positions. The image signal position 602 is delayed in a horizontal direction from the image signal position 601 mainly by time for processing by repeatedly performing calculation and data latch on the digital video signal in the camera signal processing and VTR signal processing, with respect to a horizontal reference position HD.

The processing time differs in accordance with processing content. In use of the above-described general-purpose chrominance line-sequential complementary-color interline type solid image sensing device, in digital video signal processing in the camera signal processor and the VTR signal processor and the like, generally an about 100 clock delay occurs. Note that regarding a line delay in a vertical direction due to synchronization processing in the vertical direction using a 1-horizontal-line memory or the like, since the direction of the delay is different from that of the horizontal delay, the vertical delay is not considered here. In a case where the number of clocks corresponding to one horizontal period is about 1700 clocks (27 MHz), the 100 clock delay is approximately $\frac{1}{17}$.

In FIG. 6, noise which occurred in a particular bit position in the image signal upon parallel bus drive circuit output, assuming that the processing time is about $\frac{1}{17}$ of the horizontal synchronizing period, is mixed into image signal upon image-sensing device signal output, and the noise appears as fixed pattern noise in a position delayed in the horizontal direction by the processing time.

To avoid the mixing of noise, an IC chip having the functions of the above-described analog signal processors, the image sensing device, the CDS, the AGC and the A/D, and an IC chip having the functions of the VTR signal processor as a DSPIC including the parallel bus drive circuit are arranged in careful consideration of isolation state between the power supply and the ground circuit, the packaging position, circuit pattern traces and the like in each IC chip.

In recent IC manufacturing techniques, fine circuit patterns are developed, and 1 chip has various functions. For example, an IC where the functions of the above-described CDS, AGC and A/D are integrated is known. A DSPIC where camera signal processing and VTR signal processing are combined is already well-known. As these two IC's can be manufactured by the same CMOS process, a large-scale IC where these IC's are integrated in 1 chip, to directly input an image sensing video signal from an image sensing device and directly output a digital recording format video signal, will appear in the future.

In this case, even if the circuit arrangement and isolation between the power supply and the ground circuit are fully considered, as the analog signal processors, the CDS, the AGC and the A/D, the VTR signal processor, and the parallel bus drive circuit are positioned in proximity to each other, the above-described mixing of noise cannot be prevented.

Accordingly, means for preventing the above-described mixing of noise is required to realize a so-called 1 chip signal processing IC where the analog signal processors, the CDS, the AGC and the A/D, the VTR signal processor, and the parallel bus drive circuit are integrated.

SUMMARY OF THE INVENTION

The present invention has been made in consideration of the above situation, and has its object to provide an image processing apparatus capable of reducing the influence of noise which occurs in a digital signal processing circuit.

To solve the above problem and attain the object, the image processing apparatus according to the present invention has the following construction.

That is, provided is an image processing apparatus comprising: a solid image sensing device that outputs an image sensing signal where a signal including a reset period, a feedthrough period at a reference level and a photoelectric conversion signal period is repeated at predetermined periods; a correlated double sampling circuit that processes the image sensing signal; a video signal processing circuit that further processes and converts a video signal outputted from said correlated double sampling circuit into a predetermined digital format video signal, and outputs the video signal; and an adjustment circuit that performs adjustment such that timing of data transition of a particular bit in a bit array indicating a horizontal retrace period of said digital format video signal does not overlap with a period for sampling the feedthrough period and the photoelectric conversion signal period in said correlated double sampling circuit.

Further, in the image processing apparatus according to the present invention, said adjustment circuit includes a signal delay circuit that delays a signal.

Further, in the image processing apparatus according to the present invention, said signal delay circuit has fixed delay time.

Further, in the image processing apparatus according to the present invention, said signal delay circuit has variable delay time.

Further, in the image processing apparatus according to the present invention, said adjustment circuit is included in said video signal processing circuit.

Further, in the image processing apparatus according to the present invention, said video signal processing circuit has a parallel output circuit that outputs a plural-bit digital signal in parallel, and said signal delay circuit is provided in a front stage of said parallel output circuit.

Further, in the image processing apparatus according to the present invention, said correlated double sampling circuit, said video signal processing circuit and said adjustment circuit are provided on the same semiconductor chip.

Further, the image processing apparatus according to the present invention, further comprises: a lens that focuses an image from incident light; said solid image sensing device that receives light from said lens; and a control circuit that controls said lens, said solid image sensing device and said video signal processing circuit.

Further, provided is an image processing apparatus comprising: a sampling circuit that samples an analog signal from an image sensing unit; an analog-digital converter that converts said analog signal outputted from said sampling circuit into a digital signal; a parallel output circuit that outputs a plural-bit digital signal outputted from said parallel output circuit in parallel; and an adjustment circuit that performs adjustment such that transition timing in a case where the amount of transition of the plural bit signal outputted from said parallel output circuit is greater than a predetermined value does not overlap with timing of sampling the analog signal from said image sensing device in said sampling circuit, wherein said sampling circuit, said analog-digital conversion circuit, said parallel output circuit and said adjustment circuit are formed on the same semiconductor chip.

Further, in the image processing apparatus according to the present invention, the transition timing in the case where the amount of transition of the plural bit signal outputted from said parallel output circuit is greater than a predetermined value includes timing at which all the plural bits change from 1 to 0 or timing at which all the plural bits change from 0 to 1.

Further, in the image processing apparatus according to the present invention, said sampling circuit performs correlated double sampling on an image sensing signal where a signal, including a reset period, a feedthrough period at a reference level and a photoelectric conversion signal period is repeated at predetermined periods, from said image sensing device.

Further, in the image processing apparatus according to the present invention further comprises a format circuit that processes and converts the signal from said analog-digital conversion circuit into a predetermined digital format video signal and outputs the video signal, and said parallel output circuit outputs the signal from said format circuit.

Further, in the image processing apparatus according to the present invention further comprises: a lens that focuses an image from incident light; said image sensing device that receives light from said lens; and a control circuit that controls said lens and said image sensing device.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4 and 5 are explanatory views of the recording format CCIR Rec 601;

FIG. 6 is a schematic diagram showing the noise occurrence position in the conventional art;

DETAILED DESCRIPTION OF THE PREFERRED EMBODIMENTS

Preferred embodiments of the present invention will now be described as a combination camera and digital video tape recorder in detail in accordance with the accompanying drawings.

<First Embodiment>

Figure 1:
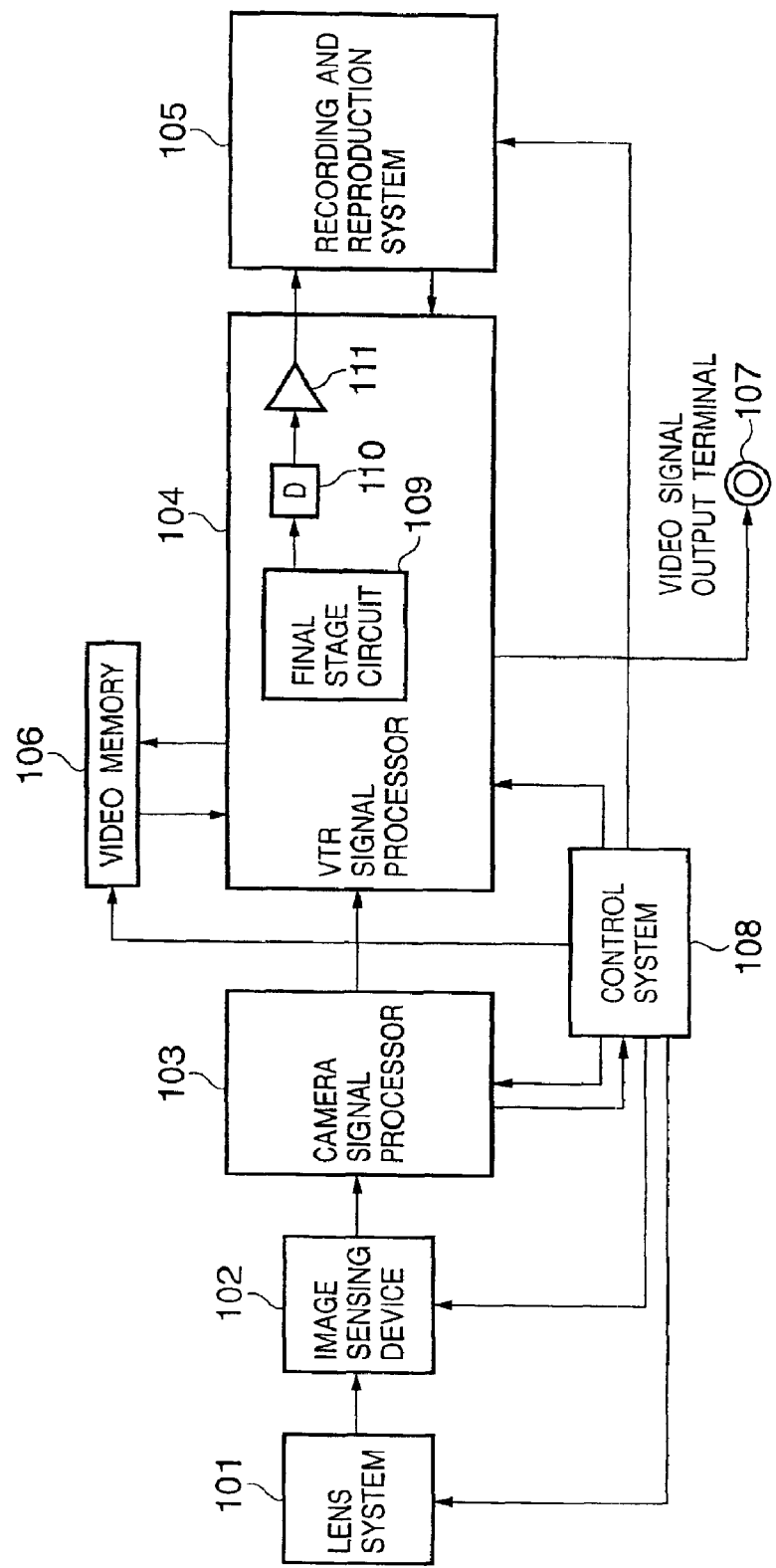
FIG. 1 is a block diagram showing the construction of a first embodiment of the present invention.

FIG. 1 is a block diagram showing the construction of the "combination camera and digital video tape recorder" as a first embodiment of the present invention. As shown in FIG. 1, the present embodiment has an image sensing unit including a lens system 101 which forms an image from incident light passed through a lens and a solid image sensing device 102 which converts the incident light from the lens system 101 into an electric signal, a camera signal processor 103 which inputs an output signal from the solid image sensing device 102 and performs signal processing in the camera, a VTR signal processor 104 which inputs a video signal from the camera signal processor 103 and performs VTR signal processing on the signal, a recording and reproduction system 105 which records an output signal from the VTR signal processor 104 on a magnetic tape upon recording and reproduces information recorded on the magnetic tape upon reproduction, a video memory 106 where the video signal from the VTR signal processor 104 is temporarily written in accordance with a control signal and the written video signal is read in accordance with a control signal, and a control system 108 which controls the lens system 101, the solid image sensing device 102, the camera signal processor 103, the VTR signal processor 104, the recording and reproduction system 105 and the video memory 106.

The lens system 101 is constructed with plural lens groups. In the lens system 101, an iris meter (not shown) is controlled by control signal outputted from the control system 108 from a signal supplied via the solid image sensing device 102 and the camera signal processor 103. In the lens system 101, the amount of incident light is limited by this iris control, thus exposure control is made. In the solid image sensing device 102, various timings of electronic shutter opening/closing control and the like are controlled in correspondence with control signals from the control system 108. Further, by the timing control, the solid image sensing device 102 outputs a video signal in conformity with the NTSC system as one of current broadcast systems to the camera signal processor 103.

In a case where the solid image sensing device 102 is often-used general-purpose chrominance line-sequential complementary-color interline type device, the camera signal processor 103 inputs a video signal outputted from the image sensing device 102 into a correlated double sampling (CDS) circuit. In this circuit, a video signal without black-level variation or horizontal line noise is obtained by eliminating reset noise which occurs upon electric charge transfer in the image sensing device 102 and 1/f noise from the input signal. The video signal outputted from the CDS circuit is gain-controlled by an automatic gain control (AGC) circuit then A/D converted by an A/D converter into a digital signal, and inputted into a digital signal processing circuit (DSP). In the DSP, luminance and color separation are performed on the signal. Regarding the luminance, a luminance signal component Y is obtained by γ conversion by a γ converter, then knee conversion by a knee converter, and finally, band limitation through a low-pass filter. Further, to obtain color signals, line-sequential chrominance signals obtained from a color separation circuit are synchronizing processed, then the signals are converted by matrix processing with the luminance signal into R, G and B primary colors, then white-balance gain-controlled, then γ-converted by a color γ converter, then knee-converted by the knee converter, then finally, matrix-converted to two types of chrominance signals, R-Y and B-Y, and outputted. The white balance control on the video signal and the AGC control to gain-control the signal level of the video signal are performed in accordance with control signals from the control system 108.

The VTR signal processor 104 outputs a video signal from a digital video signal from the camera signal processor 103, via an output terminal 107. The VTR signal processor 104 is supplied with a control signal from the control system 108 to generate a digital VTR signal corresponding to the format of the VTR. Further, the VTR signal processor 104 outputs the digital video signal from the camera signal processor 103 to the video memory 106 in accordance with a memory control signal from the control system 108. The VTR signal processor 104 may have a digital effect signal processor to perform special effect processing on a supplied video signal.

The video memory 106 is constructed with e.g. a field memory or a frame memory. As described above, signal write/read control with respect to the video memory 106 is performed by the control system 108.

Upon recording, the recording and reproduction system 105 records the video signal supplied from the VTR signal processor 104, as a moving picture or a still picture, in a digital signal format, on a recording track of magnetic tape, via a rotary magnetic head provided in a rotary head drum. Upon reproduction, the recording and reproduction system 105 reproduces the digital video signal recorded on the recording track of the magnetic tape, as a moving picture or a still picture, via the rotary head drum.

A delay circuit 110 is provided between a final stage circuit 109 where formation of digital VTR signal corresponding to the VTR digital recording format is completed and a digital parallel bus drive circuit 111 in the VTR signal processor 104.

The video signal in the digital recording format outputted from the final stage circuit 109 is inputted into the delay circuit 110. The delay circuit 110 delays the digital recording format signal by a predetermined period such that a data transition point of particular bit in a bit array indicating the start and end positions of the video signal data in the horizontal direction, added in a horizontal retrace period (H blanking) of the digital recording format signal outputted from the digital parallel bus drive circuit 111, does not overlap with a period for sampling the feedthrough period and the photoelectric conversion signal period in the correlated double sampling (CDS) circuit. The delay time of the delay circuit 110 is 1 period of the reference clock at the maximum.

For example, assuming that the reference clock frequency is 27 MHz, 1 period is about 37 nS (nanoseconds). Accordingly, generally the delay circuit can be easily realized by serially arraying high-speed buffer type CMOS gates having 3 to 4 nS transmission delay time such that the data transition point does not overlap with the feedthrough period and the period for sampling the photoelectric conversion signal period in the correlated double sampling (CDS) circuit.

Figure 2:
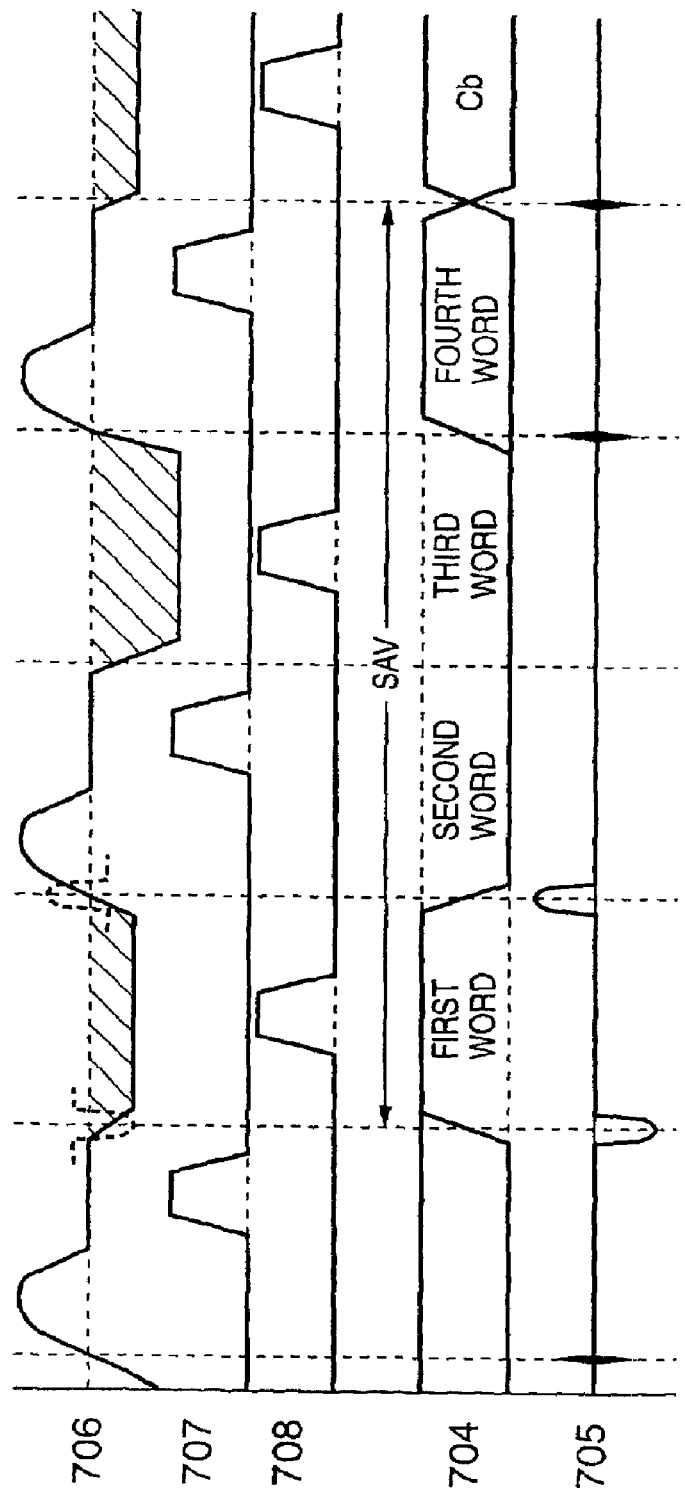
FIG. 2 is a timing chart showing the operation of the first embodiment.

FIG. 2 is a timing chart showing that the mixing of noise in the CDS circuit is prevented by a predetermined period delay of the digital recording format signal. As shown in FIG. 2, the delay time of the delay circuit 110 is set such that the position of noise occurred from the digital parallel bus drive circuit 111 does not overlap with the sampling opening period.

The delay time is determined in accordance with the general amount of transmission delay by the subsequent circuits, i.e., the above-described CDS circuit, the AGC circuit, the A/D circuit and the camera signal processor DSP circuit, the VTR signal processor DSP circuit, with respect to the drive timing of the solid image sensing device 102 and the sampling timing in the CDS circuit uniquely determined by this drive timing.

Note that the delay circuit 110 is positioned between the final stage circuit 109 where the formation of digital VTR signal corresponding to the VTR digital recording format is completed and the digital parallel bus drive circuit 111, in the VTR signal processor 104, however, the present invention is not limited to this position. The delay circuit may be placed in any position in the VTR signal processor 104 as long as the above timing is obtained. In this case, the respective control system pulses may be shifted by the delay circuit in correspondence with the positional change. Thus other various arrangements than that of the present embodiment may be used.

Further, as described above, the present invention is advantageous when a so-called 1-chip large-scale signal processing IC where the analog signal processors, i.e., the CDS, the AGC and the A/D, the VTR signal processor, and the parallel bus drive circuit are integrated is realized. However, even in the conventional case where an IC chip having the functions of analog signal processors, i.e., the image sensing device, the CDS, the AGS and the A/D, and an IC chip having the functions of the VTR signal processor as a DSPIC including the parallel bus drive circuit are separately provided, it is not necessary to carefully consider the isolation state between the power supply and the ground circuit of the IC chip, the packaging position, the circuit pattern traces and the like as in the case of the conventional art. That is, as the freedom of circuit arrangement is increased and high density packaging is possible, the circuit substrate of the combination camera and digital video tape recorder can be downsized.

Further, the solid image sensing device in the present embodiment is a general-purpose chrominance line-sequential complementary-color interline type device, however, the image sensing device is not limited to this type but may be of other single-chip coating type or multi-chip solid image sensing device such as a 3-chip image sensing device where image sensing devices are allotted to respective RGB. Further, the format of the recording and reproduction system is not limited. It is apparent that the present invention is applicable to any digital recording format video tape recorder.

<Second Embodiment>

Figure 3:
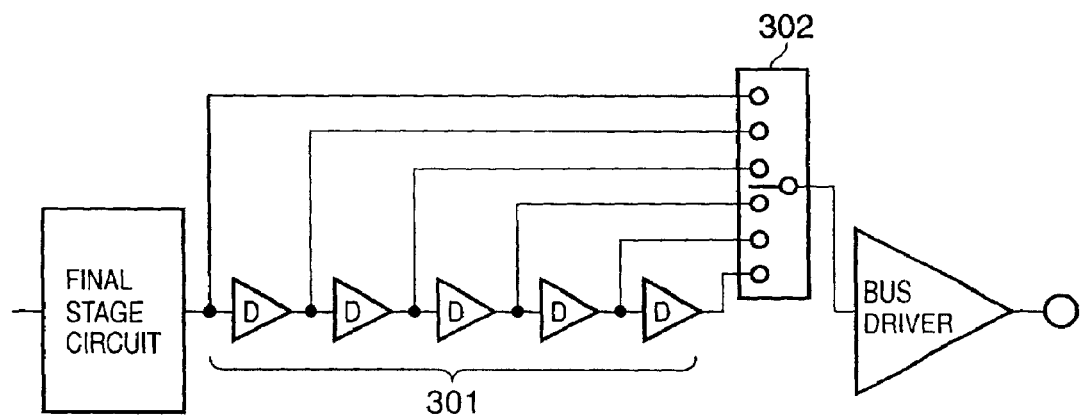
FIG. 3 is a block diagram showing a delay circuit in a second embodiment of the present invention.
Figure 4:
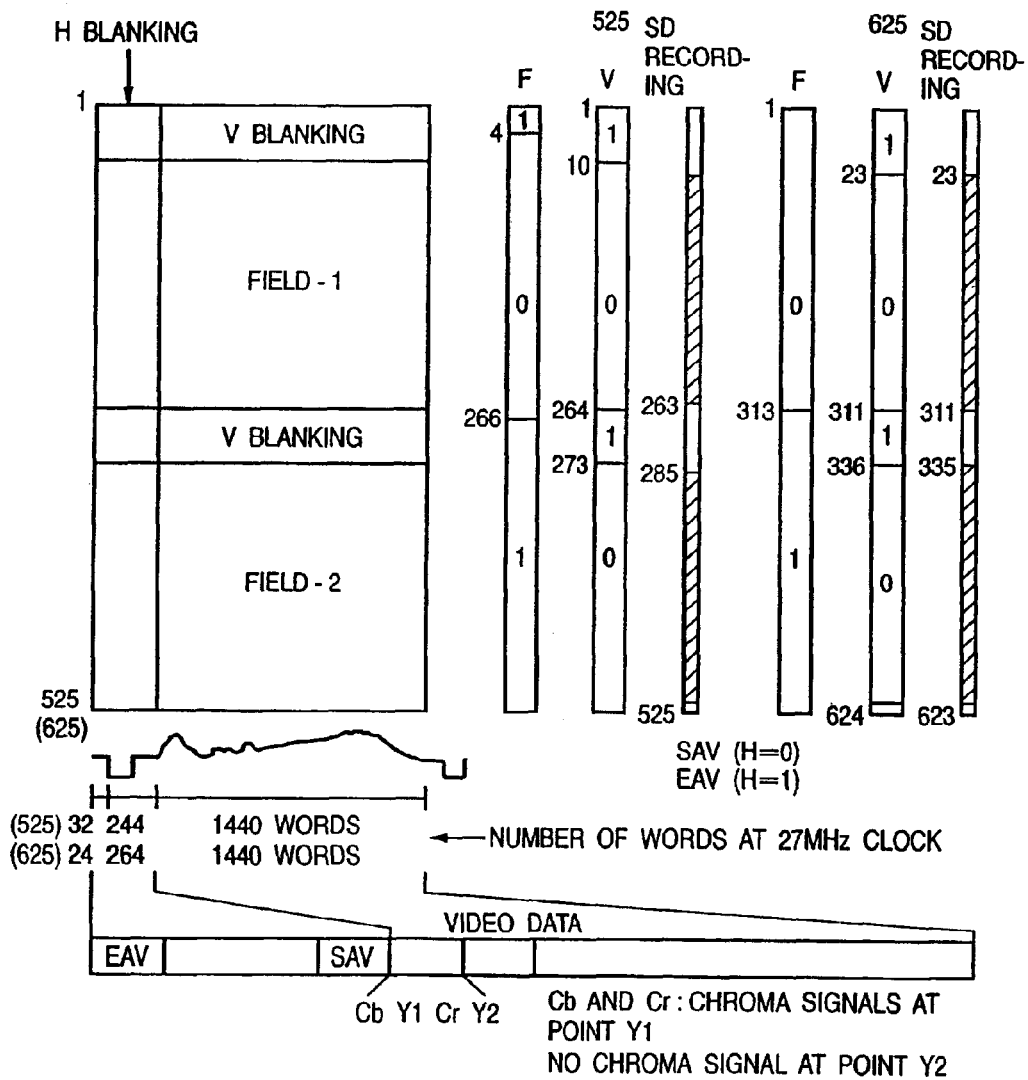
Figure 7:
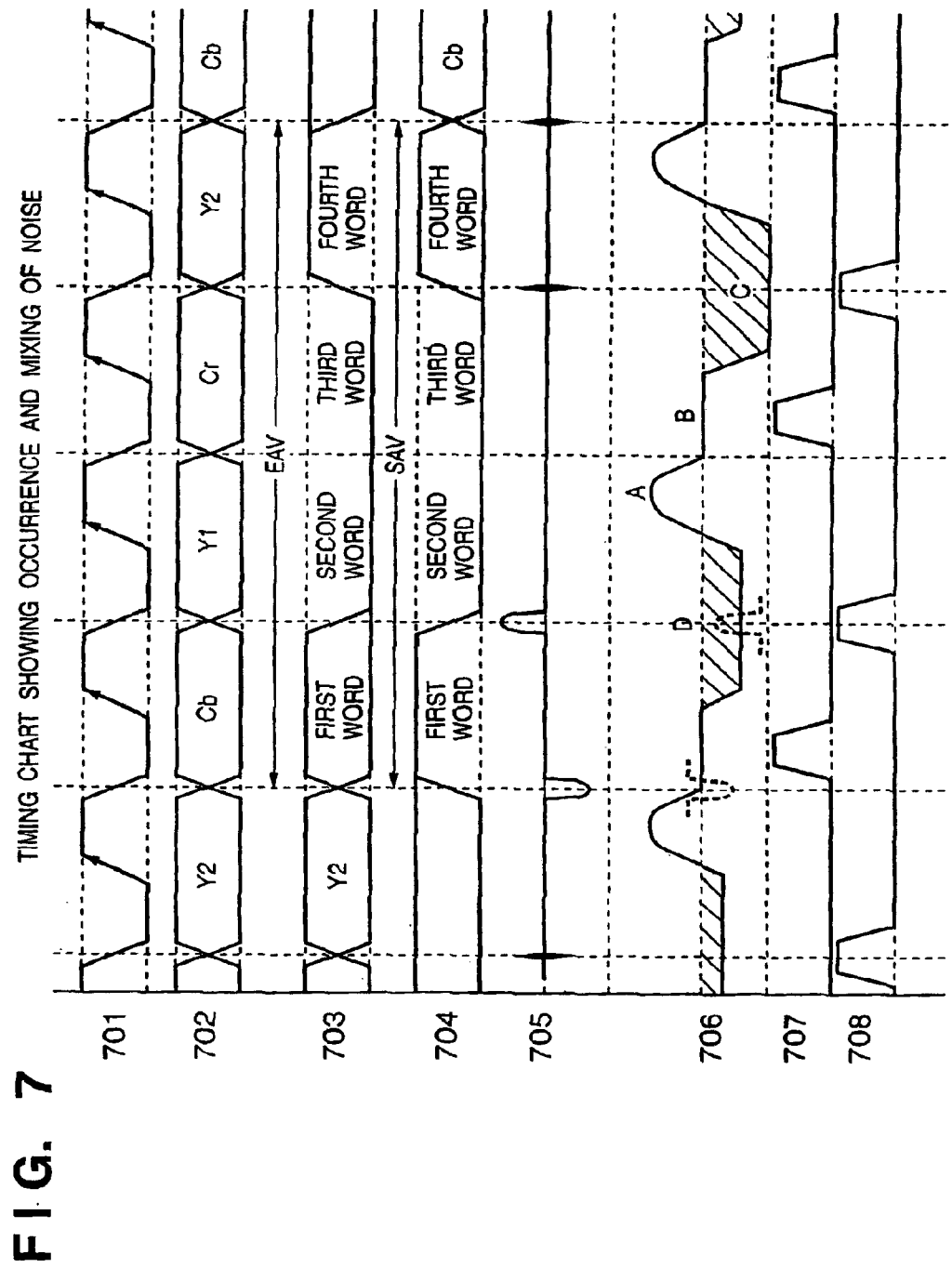
FIG. 7 is a timing chart showing the occurrence and the mixing of noise.
Figure 8:
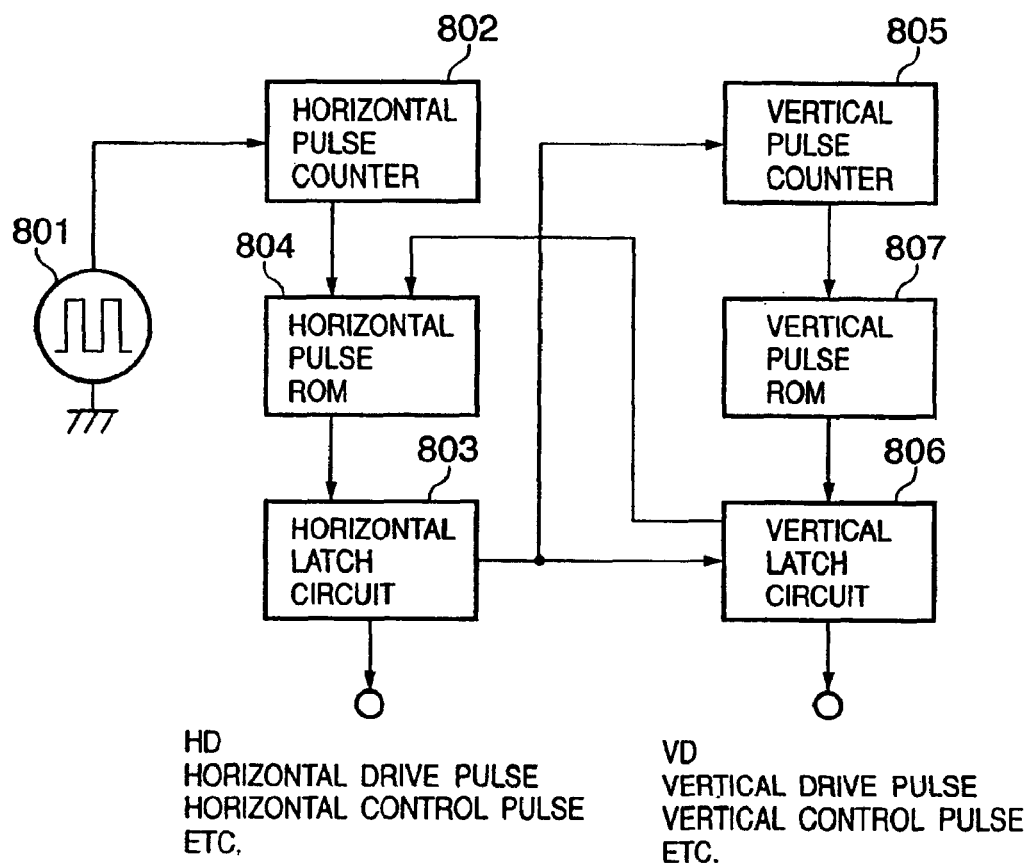
FIG. 8 is a block diagram showing the construction of the circuit for generating synchronizing signals and control signal pulses.
Figure 9:
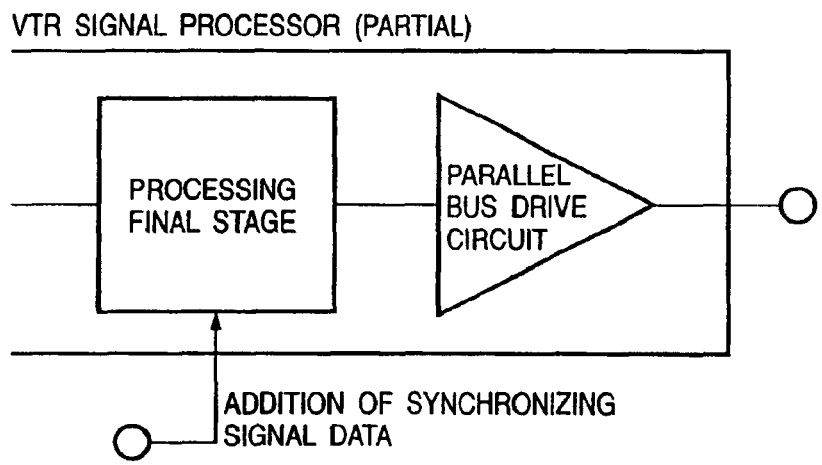
FIG. 9 is a block diagram showing the arrangement of the processing final stage and the parallel bus drive circuit in the VTR signal processor.

FIG. 3 is a block diagram showing an example where the delay circuit 110 based on a fixed delay time method in FIG. 1 is replaced with the circuit based on a variable delay time method. Hereinbelow, the example will be described as a second embodiment.

In FIG. 3, respective outputs from serially provided high-speed buffer type CMOS gates 301 are connected to a multiplexer 302. The amount of delay time can be programmed such that the position of noise from the digital parallel bus drive circuit, caused by a signal input selected by the multiplexer 302, corresponds to timing of least possibility of the mixing of noise in the CDS circuit. In this arrangement, the mixing of noise can be easily avoided even in a case where the drive period of the solid image sensing device is changed, and even in a case where the entire transmission delay time is changed as a result of changing the CDS circuit, the AGC circuit and the A/D circuit and the like.

As described above, the present embodiment prevents the mixing of noise with a video signal from a bit having high transition potential, caused by the parallel bus drive circuit added to the output final stage of the signal processor, and can realize a so-called 1-chip large-scale signal processing IC where the analog signal processors, the CDS, the AGC and the A/D, the signal processor, and the parallel bus drive circuit are integrated. Further, even in the conventional case where an IC chip having the functions of analog signal processors, i.e., the image sensing device, the CDS, the AGS and the A/D, and an IC chip having the functions of the VTR signal processor as a DSPIC including the parallel bus drive circuit are separately provided, it is not necessary to carefully consider the isolation state between the power supply and the ground circuit of the IC chip, the packaging position, the circuit pattern traces and the like as in the case of the conventional art. That is, as the freedom of circuit arrangement is increased and high density packaging is possible, the circuit substrate of the combination of camera and digital video tape recorder can be downsized.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   a solid image sensing device that outputs an image sensing signal where a signal including a reset period, a feedthrough period at a reference level and a photoelectric conversion signal period is repeated at predetermined periods;
   a correlated double sampling circuit that processes the image sensing signal;
   a video signal processing circuit that further processes and converts a video signal outputted from said correlated double sampling circuit into a predetermined digital format video signal, and outputs the video signal; and
   an adjustment circuit that performs adjustment such that timing of data transition of a particular bit in a bit array indicating a horizontal retrace period of said digital format video signal does not overlap with a period for sampling the feedthrough period and the photoelectric conversion signal period in said correlated double sampling circuit.

2. The image processing apparatus according to claim 1, wherein said adjustment circuit includes a signal delay circuit that delays a signal.

3. The image processing apparatus according to claim 2, wherein said signal delay circuit has fixed delay time.

4. The image processing apparatus according to claim 2, wherein said signal delay circuit has variable delay time.

5. The image processing apparatus according to claim 1, wherein said adjustment circuit is included in said video signal processing circuit.

6. The image processing apparatus according to claim 1, wherein said video signal processing circuit has a parallel output circuit that outputs a plural-bit digital signal in parallel, and wherein said signal delay circuit is provided in a front stage of said parallel output circuit.

7. The image processing apparatus according to claim 1, wherein said correlated double sampling circuit, said video signal processing circuit and said adjustment circuit are provided on the same semiconductor chip.

8. The image processing apparatus according to claim 1, further comprising:
   a lens that focuses an image from incident light;
   said solid image sensing device that receives light from said lens; and
   a control circuit that controls said lens, said solid image sensing device and said video signal processing circuit.

9. An image processing apparatus comprising:
   a sampling circuit that samples an analog signal from an image sensing unit;

an analog-digital converter that converts said analog signal outputted from said sampling circuit into a digital signal;

a parallel output circuit that outputs a plural bit digital signal in parallel, wherein said parallel output circuit processes the digital signal from said analog-digital converter; and an adjustment circuit that performs adjustment such that transition timing in a case where the amount of transition of the plural bit signal outputted from said parallel output circuit is greater than a predetermined value does not overlap with timing of sampling the analog signal from said image sensing device in said sampling circuit, wherein said sampling circuit, said analog-digital conversion circuit, said parallel output circuit and said adjustment circuit are formed on the same semiconductor chip.

10. The image processing apparatus according to claim 9, wherein the transition timing in the case where the amount of transition of the plural bit signal outputted from said parallel output circuit is greater than a predetermined value includes timing at which all the plural bits change from 1 to 0 or timing at which all the plural bits change from 0 to 1.

11. The image processing apparatus according to claim 9, wherein said sampling circuit performs correlated double sampling on an image sensing signal where a signal, including a reset period, a feedthrough period at a reference level and a photoelectric conversion signal period is repeated at predetermined periods, from said image sensing device.

12. The image processing apparatus according to claim 9, further comprising a format circuit that processes and converts the signal from said analog-digital conversion circuit into a predetermined digital format video signal and outputs the video signal, wherein said parallel output circuit outputs the signal from said format circuit.

13. The image processing apparatus according to claim 9, further comprising:

said image sensing device that receives a lens that focuses an image from incident light;

said image sensing device that receives light from said lens; and a control circuit that controls said lens and said image sensing device.

* * * * *